E. L. WEAVER.
BRAKE MECHANISM FOR VEHICLES.
APPLICATION FILED OCT. 10, 1917.
1,276,296.
Patented Aug. 20, 1918.
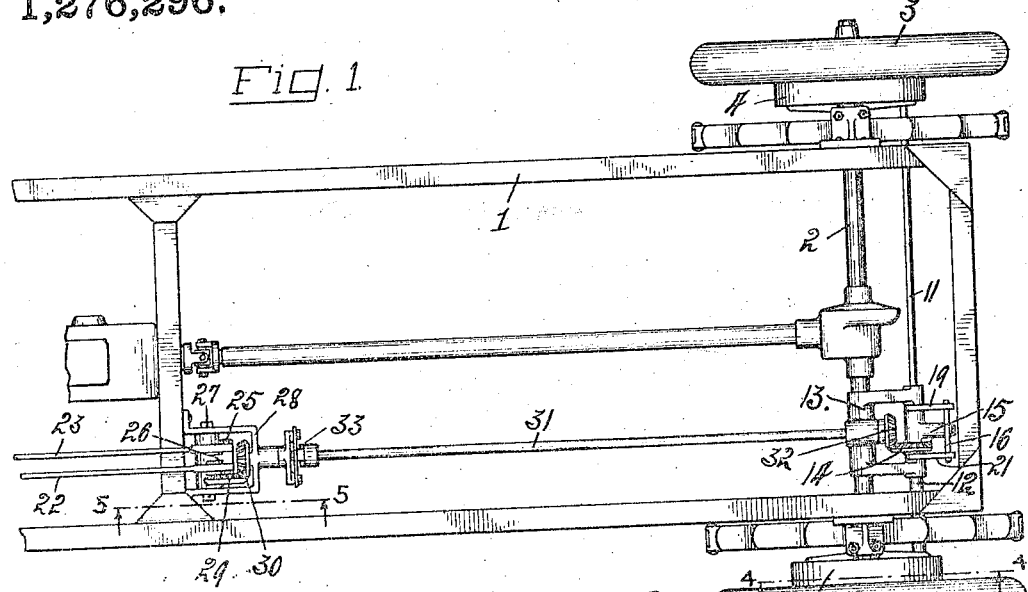
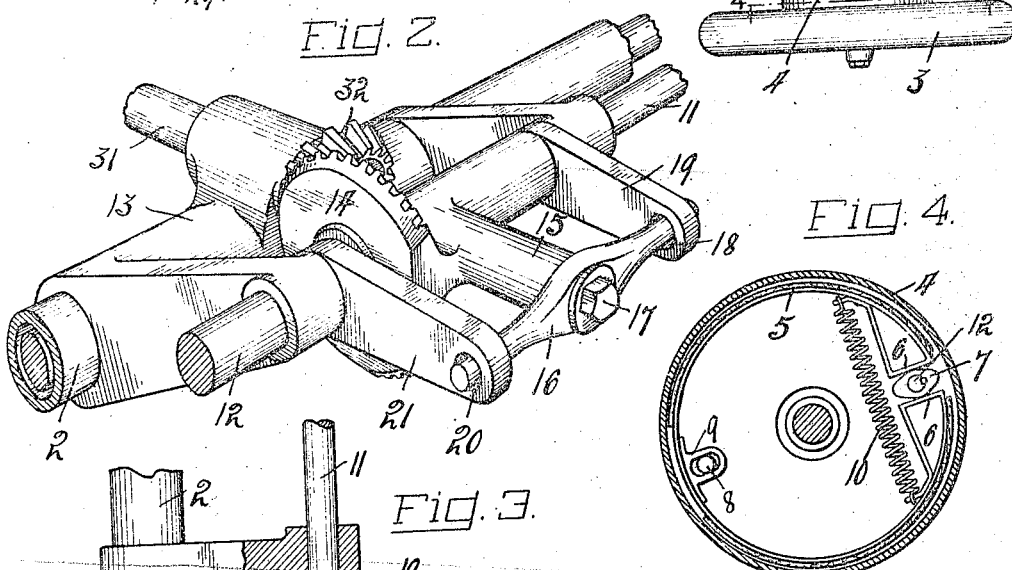
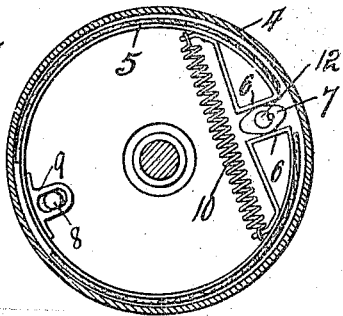
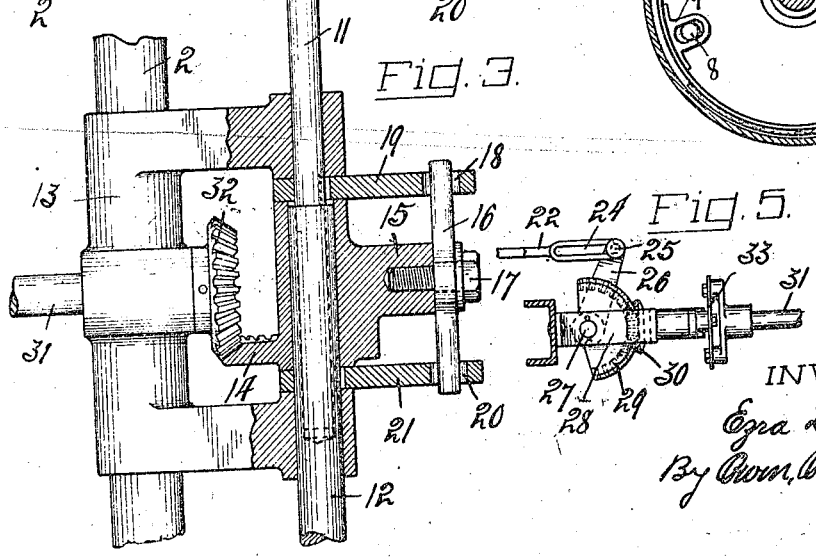
INVENTOR
Ezra L. Weaver,
By Owen, Owen & Crampton
His attys

UNITED STATES PATENT OFFICE.

EZRA L. WEAVER, OF TOLEDO, OHIO, ASSIGNOR OF ONE-HALF TO GEORGE J. MADDEN, OF TOLEDO, OHIO.

BRAKE MECHANISM FOR VEHICLES.

1,276,296.

Specification of Letters Patent. Patented Aug. 20, 1918.

Application filed October 10, 1917. Serial No. 195,705.

*To all whom it may concern:*

Be it known that I, EZRA L. WEAVER, a citizen of the United States, and a resident of Toledo, in the county of Lucas and State of Ohio, have invented a certain new and useful Brake Mechanism for Vehicles; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to brake-control means for motor vehicles, and has for its object the provision of a simple and improved mechanism of this character, which is connected to a plurality of brake members and operable to automatically equalize the braking pressure on all of said members when applying a braking action thereto, thereby preventing the skidding which occurs when the brakes of a vehicle are applied with unequal pressure, and also avoiding other objections incident to the unequal application of the brakes on different wheels of a vehicle, as is well understood in the art.

A further object of my invention is the provision of a brake-control mechanism for vehicles, which has connection with a single brake for each of the brake-wheels and is operable by either the customary brake-pedal or emergency brake-lever of a motor-driven vehicle. A further object of my invention is the provision of a single control means for vehicle-brakes, which eliminates the use of the numerous draft-rods and connecting-levers heretofore employed, and therefore lessens the liability of noise and rattle occurring in the brake-mechanism.

The invention is fully described in the following specification, and while, in its broader aspect, it is capable of embodiment in numerous forms, a preferred embodiment thereof is illustrated in the accompanying drawings, in which—

Figure 1 is a top plan view of a portion of an automobile chassis embodying the invention. Fig. 2 is an enlarged perspective view, and Fig. 3 an enlarged sectional detail of the pressure equalizing means of the invention. Fig. 4 is an enlarged section on the line 4—4 in Fig. 1, and Fig. 5 is an enlarged side elevation on the line 5—5 in Fig. 1.

Referring to the drawings, 1 designates a chassis-frame, 2 the rear axle housing, and 3, 3 the rear drive-wheels of a motor-driven vehicle, each of said drive-wheels being provided with the customary brake-drum 4, which is engaged internally thereof by an expanding friction brake-ring 5. This ring is split at one side with the ends thereof circumferentially spaced and provided with radially broadened surfaces 6, between which an expanding block 7 is mounted, whereby a movement of such block from normal position will effect an expansion of the ring 5 into braking engagement with the drum 4, as is apparent. The ring 5 is carried at a point substantially diametrically opposite its split portion by a stud 8, which projects from the customary enlargement or bracket at the adjacent end of the housing 2 and enters the radially elongated slot of a lug 9, that is carried by the ring 5 internally thereof. It is evident that the slotted connection of the ring 5 with the stud 8 permits an inward movement of the central portion of the ring out of engagement with the drum 4 when the ring is in collapsed position. A coiled contractile spring 10 acts on the ring 5 to normally retain it in collapsed position.

A shaft is mounted at one side of the rear axle housing 2, at the rear thereof, in the present instance, and comprises the two sections 11 and 12, which have their inner ends preferably telescoped for relative rotary movements and journaled in the arms of a bearing-fork 13 projecting from the rear axle housing. The outer ends of these shaft-sections fixedly carry the brake expanding blocks 7 of the respective brakes.

A bevel-gear segment 14 is loosely mounted on the inner end portion of one of said shaft-sections, 12 in the present instance, between the arms of the bearing-fork 13 and has a boss 15 radially projecting rearward from its hub-sleeve and carrying a cross-arm 16 for pivotal turning movements relative thereto, said cross-arm being held to the boss by a screw 17. One end of the cross-arm 16 loosely enters an opening 18 in an arm 19, which fixedly projects rearward from the shaft 11, while the other end of said arm loosely enters an opening 20 in an arm 21, which fixedly projects rearward from the shaft-section 12. It is thus evident that when a turning movement is imparted to the gear-segment 14 the cross-arm 16 will first rock on its pivot to compensate for any play or loose movement in one or the other of the shaft-sections 11, 12 and will then apply a positive uniform turning movement to each shaft section to effect a uniform application to the associated brakes.

Both the customary foot brake-pedal and the emergency brake-lever of an automobile may have operating connection with the gear-segment 14 in any suitable manner. In the present instance, 22 may designate the draft-rod, which is connected to and extends rearward from the lower end of the foot-pedal (not shown), and 23 the draft-rod which is connected to and extends rearward from the lower end of the emergency brake-lever (not shown). Both of these rods may have their rear ends longitudinally slotted, as at 24 (Fig. 5), and loosely receiving a bolt 25 projecting crosswise through the outer end of the rocker-arm 26, which is mounted on a shaft 27, that is journaled in a bearing-yoke 28. A bevel-gear segment 29 is fixedly connected to the inner sleeved end portion of the rocker-arm 26 and is in mesh with a bevel-gear 30, the shaft 31 of which is journaled in the yoke 28 and bearing-fork 13 and has its rear end provided with a bevel-gear 32 in mesh with the gear-segment 14. The shaft 31 has a flexible joint 33 intermediate its ends.

It is evident that the sliding connection of each draft-rod 22, 23 with the rocker-arm 26 enables either of said rods to have a brake-applying movement imparted thereto without moving the other and that such brake-applying movement is communicated through the shaft 31 to the gear-segment 14 and lost motion compensating means associated therewith.

With this form of brake-control the numerous rods and connecting levers customarily employed in connection with the brake-control mechanism of vehicles are eliminated and a control-mechanism substituted therefor, which is less liable to become loose and rattle during use.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent, is—

1. The combination with two brakes, of a sectional operating shaft therefor, an arm fixedly projecting from each shaft-section, a member loosely mounted on one of said sections between said arms, means connecting said member and arms for imparting rotation to the arms in the same direction when the member is rotated and to permit a limited relative movement of the arms to compensate for lost motion, operating means for imparting rotation to said member, said operating means comprising a shaft in geared connection with said member, a rocker-arm in geared connection with said shaft, and separate operating draft-rods in pin-and-slot connection with said rocker-arm.

2. In a brake mechanism for vehicles, a brake, a shaft extending longitudinally of the vehicle, operating connection between said shaft and brake, a motion converting member movable longitudinally of the vehicle, connection between said member and shaft for imparting rotation to the latter from movements of the former, and a plurality of manually controlled brake operating elements in separate pin and slot connection with said member whereby said member may be operated by a movement of either of said elements.

In testimony whereof, I have hereunto signed my name to this specification.

EZRA L. WEAVER.